US008926194B2

(12) United States Patent
Chang et al.

(10) Patent No.: US 8,926,194 B2
(45) Date of Patent: Jan. 6, 2015

(54) OPTICAL BOARD HAVING SEPARATED LIGHT CIRCUIT HOLDING MEMBER AND OPTICAL LAYER (75) Inventors: Yen-Chih Chang, New Taipei (TW); Wen-Yi Hsieh, New Taipei (TW); Ke-Hao Chen, Tu-cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 826 days.

(21) Appl. No.: 13/014,794

(22) Filed: Jan. 27, 2011

(65) Prior Publication Data

US 2011/0188817 A1 Aug. 4, 2011

(30) Foreign Application Priority Data

Feb. 1, 2010 (TW) .................................. 99202047

(51) Int. Cl.
*G02B 6/36* (2006.01)
(52) U.S. Cl.
CPC ........................................ *G02B 6/36* (2013.01)
USPC ................................................ 385/89; 385/93
(58) Field of Classification Search
USPC ....................................................... 385/89, 93
See application file for complete search history.

(56) References Cited

U.S. PATENT DOCUMENTS

| 6,901,185 | B2 * | 5/2005 | Sasaki et al. ..................... 385/33 |
| 7,162,124 | B1 | 1/2007 | Gunn, III et al. |
| 7,329,054 | B1 | 2/2008 | Epitaux et al. |
| 7,366,380 | B1 | 4/2008 | Peterson et al. |
| 7,384,202 | B2 * | 6/2008 | Nagasaka ........................ 385/88 |
| 7,422,374 | B2 | 9/2008 | Pitwon |
| 7,559,702 | B2 * | 7/2009 | Fujiwara et al. ................ 385/88 |
| 7,630,593 | B2 * | 12/2009 | Furuno et al. ................... 385/14 |
| 8,277,129 | B2 * | 10/2012 | Sabano et al. ................... 385/83 |
| 8,469,610 | B2 * | 6/2013 | Shao et al. ....................... 385/93 |
| 8,632,263 | B2 * | 1/2014 | Nekado et al. .................. 385/92 |
| 2006/0098923 | A1 * | 5/2006 | Fujiwara et al. ................ 385/88 |
| 2006/0104576 | A1 * | 5/2006 | Nagasaka ........................ 385/93 |
| 2007/0177844 | A1 * | 8/2007 | Nagasaka ........................ 385/89 |

* cited by examiner

*Primary Examiner* — Sung Pak
(74) *Attorney, Agent, or Firm* — Ming Chieh Chang; Wei Te Chung (57) ABSTRACT An optical board (100) includes a base layer (1), an optical module (4) assembled to the base layer, and an optical layer (2) attached to the base layer and defining a receiving recess (23). The optical module includes a ferrule (41) received in the receiving recess and defining a number of grooves (4131), and a number of optical circuits (42) positioned in the grooves of the ferrule. The optical circuits extend outside of the ferrule and into the optical layer.

18 Claims, 11 Drawing Sheets

OPTICAL BOARD HAVING SEPARATED LIGHT CIRCUIT HOLDING MEMBER AND OPTICAL LAYER

BACKGROUND OF THE INVENTION

1. Field of the Invention

The present invention relates to an optical board, and more particularly to an optical board having light circuit holding member and optical layer formed into two separated pieces before mounting and assembled together in use.

2. Description of Related Art

One type of conventional optical boards have a plurality of fibers embedded in the optical board. In this arrangement, it is necessary to etch a plurality of V-shaped recesses in the optical board and to fix the fibers in the V-shaped recesses at predetermined positions.

U.S. Pat. No. 7,162,124 issued to Gunn, III et al. on Jan. 9, 2007 discloses a fiber to chip coupler for connecting an optical fiber to an integrated circuit or chip by laying or bonding on top of the surface of the chip a section of fiber. As an alternate way of bonding a fiber, the fiber can be bonded or soldered to a ferrule, connector, or pedestal, which is itself bonded or soldered to the chip or a package that encloses the chip and the pedestal. To align and multiple fibers, each of the fibers can be aligned to one pedestal with, for example, multiple grooves, which is then attached to an integrated circuit. U.S. Pat. No. 7,366,380 issued to Peterson et al. on Apr. 29, 2008 further discloses a planar lightwave circuit (PLC) for connecting optical fibers or waveguides on a first substrate to the top of an optical or optoelectronic device or integrated circuit of a second substrate where the optical waveguide is positioned adjacent to the base of the first substrate and adjacent to the top of the second substrate.

U.S. Pat. No. 7,422,374 issued to Pitwon on Sep. 9, 2008 discloses an optical printed circuit board. The optical printed circuit board includes a support layer, an optical layer having upper and lower cladding layers and an optical core layer, functioning as waveguides, between the upper and lower cladding layers. The optical printed circuit board further has a socket for receiving an optical component. The socket includes a plurality of alignment features for aligning waveguides with the optical component received in the socket.

The present invention aims to provide an optical board having separated fiber array holding member and optical layer to simply its manufacture.

SUMMARY OF THE INVENTION

Accordingly, an object of the present invention is to provide an optical board having a light circuit holding member and an optical layer formed into two separated pieces before mounting.

In order to achieve the object set forth, an optical board includes a base layer, an optical module assembled to the base layer, and an optical layer attached to the base layer and defining a receiving recess. The optical module includes a ferrule received in the receiving recess and defining a number of grooves, and a number of optical circuits positioned in the grooves of the ferrule. The optical circuits extend outside of the ferrule and into the optical layer.

The ferrule defines a number of grooves for positioning the fibers. The ferrule together with the fibers are assembled to the optical layer. The optical module and the optical layer are two separated pieces and therefore it is unnecessary to etch grooves on the optical layer or to form waveguides in the optical layer directly. The manufacture of the optical board has been simplified.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1-5, an optical board 100 in accordance with a first embodiment of the present invention is used to connect optical fibers 42 to an optical or optoelectronic device, or optical or optoelectronic integrated circuit, for providing a low loss optical coupling between the fibers and the device or integrated circuit. The optical board 100 comprises a base layer 1, a cladding layer 3 of conventional construction and function, an optical layer 2 sandwiched between the base layer 1 and the cladding layer 3, an optical module 4 and a coupler 5 coupled to the optical module 4. The coupler 5 is formed with a pair of mounting posts 51.

Figure 1:
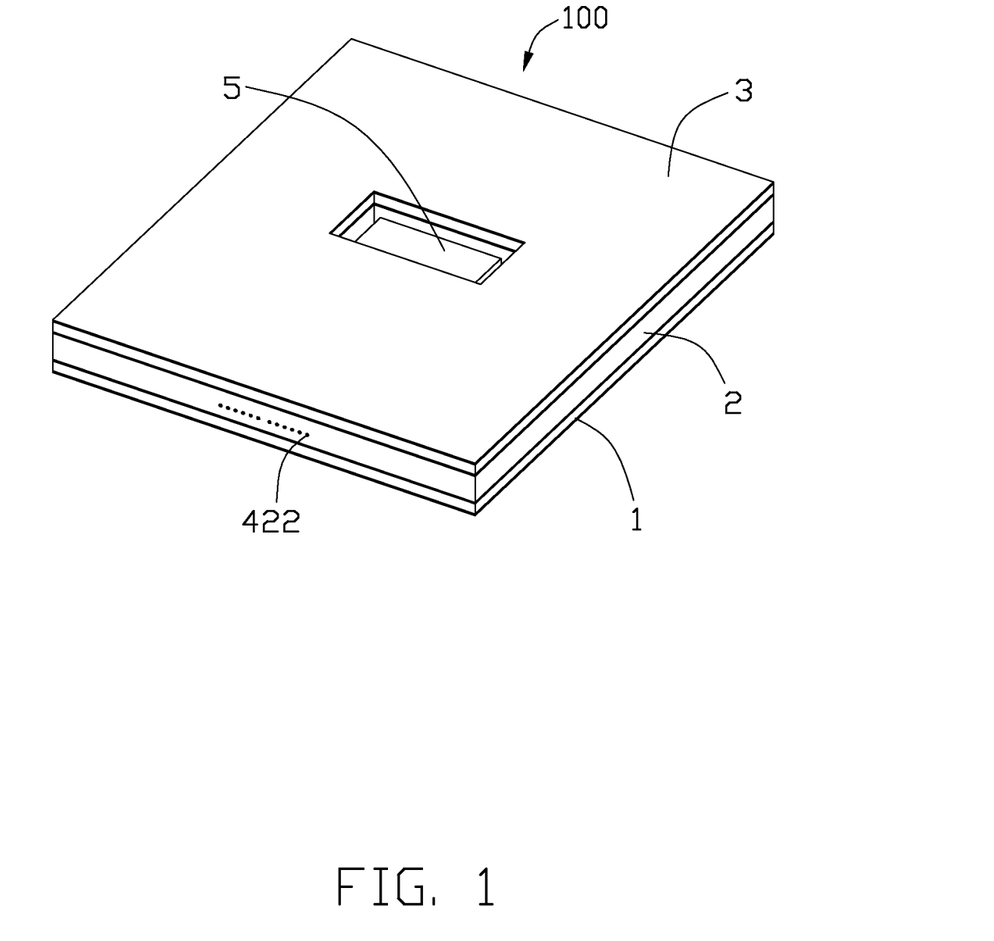
FIG. 1 is an assembled perspective view showing an optical board in accordance with a first embodiment of the present invention.
Figure 2:
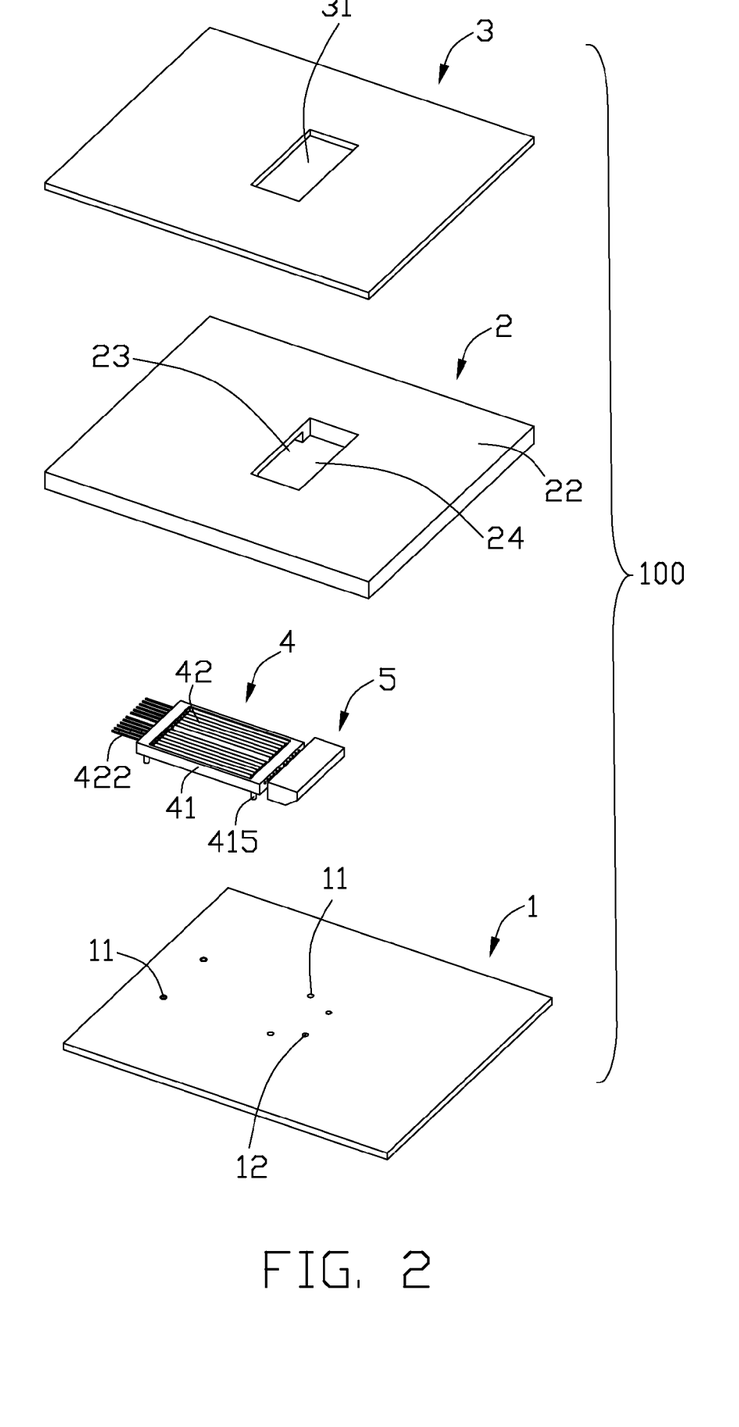
FIG. 2 is a partially exploded perspective view showing the optical board.

Referring to FIG. 2, the base layer 1 in this embodiment is a circuit board. The base layer 1 has four first mounting holes 11 and two second mounting holes 12.

Figure 3:
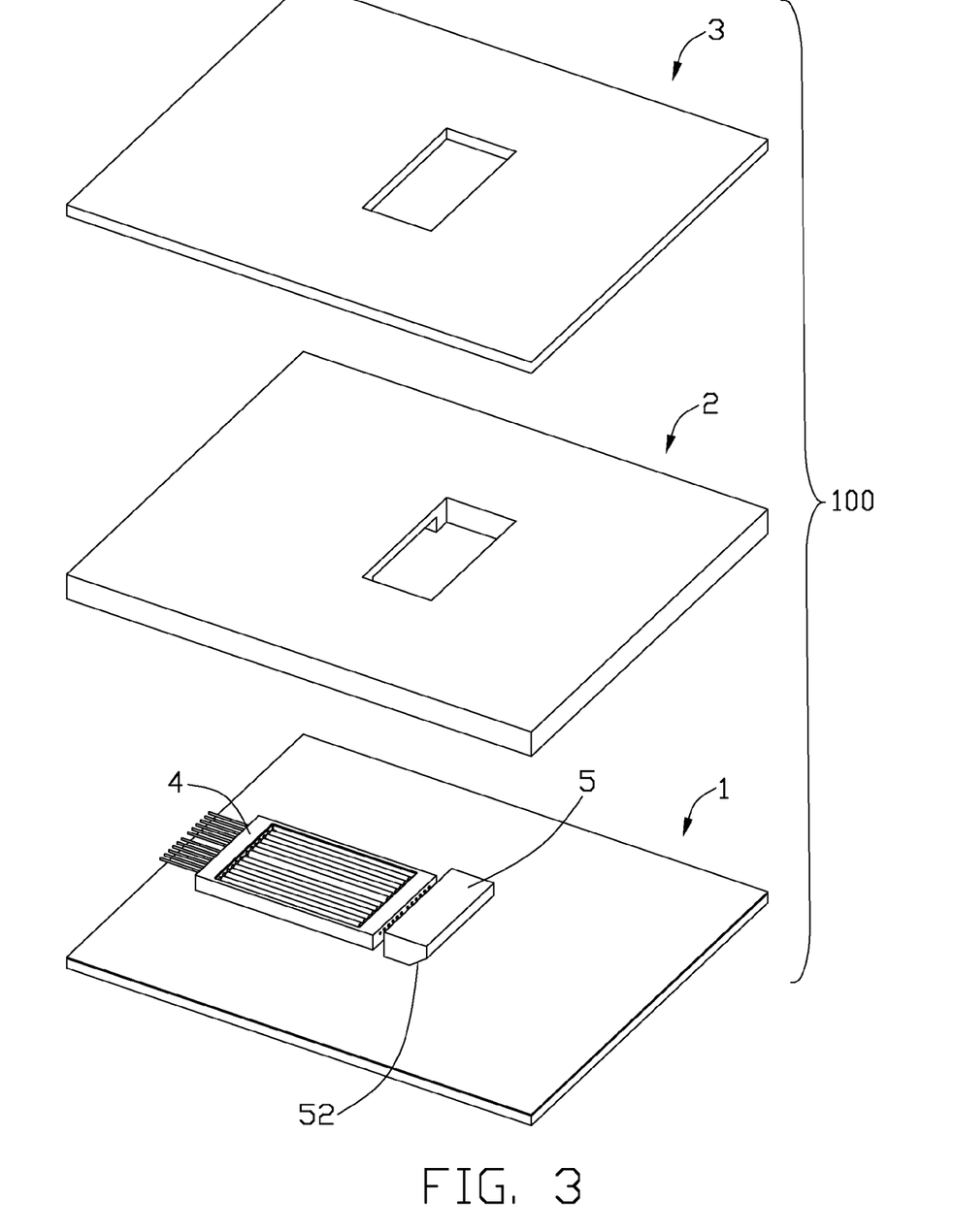
FIG. 3 is a view similar to FIG. 2, when an optical module and a coupler are mounted on the base layer.
Figure 4:
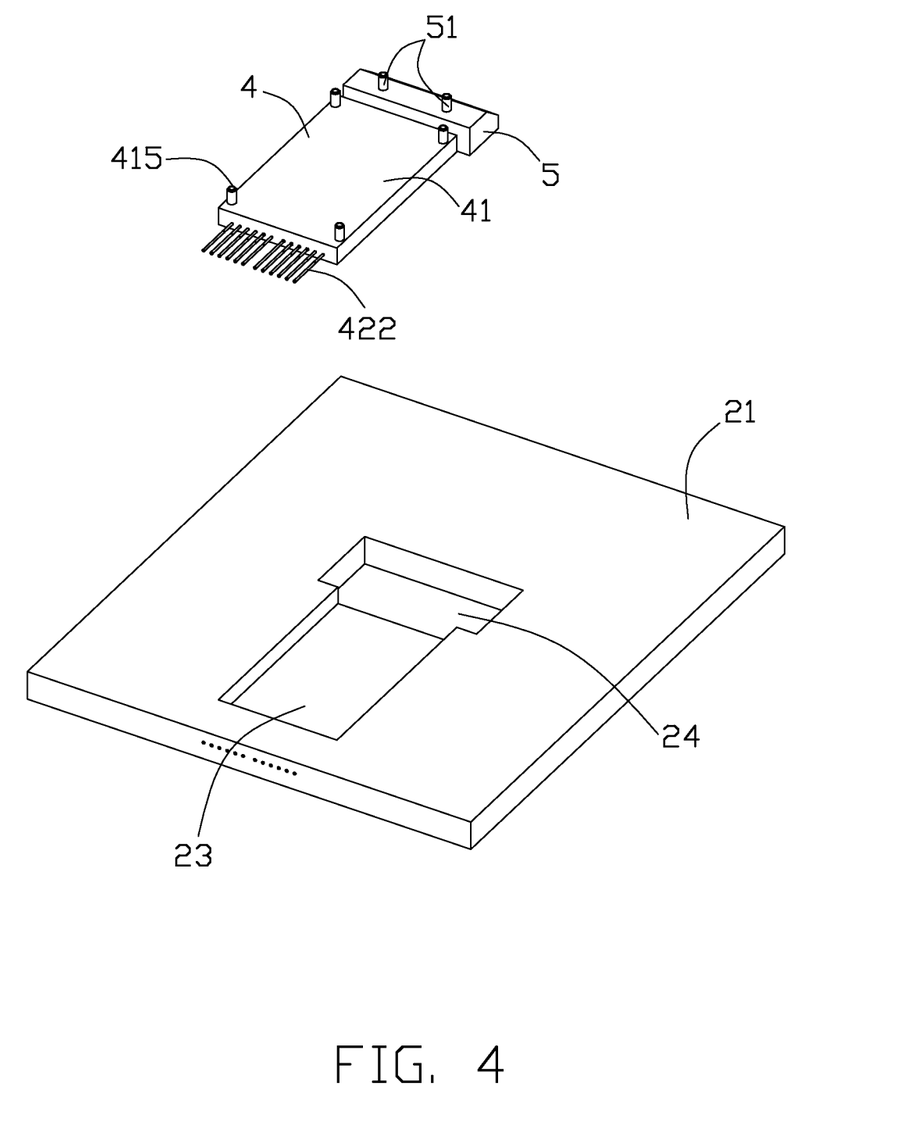
FIG. 4 is a perspective view showing the optical layer and the optical module.
Figure 5:
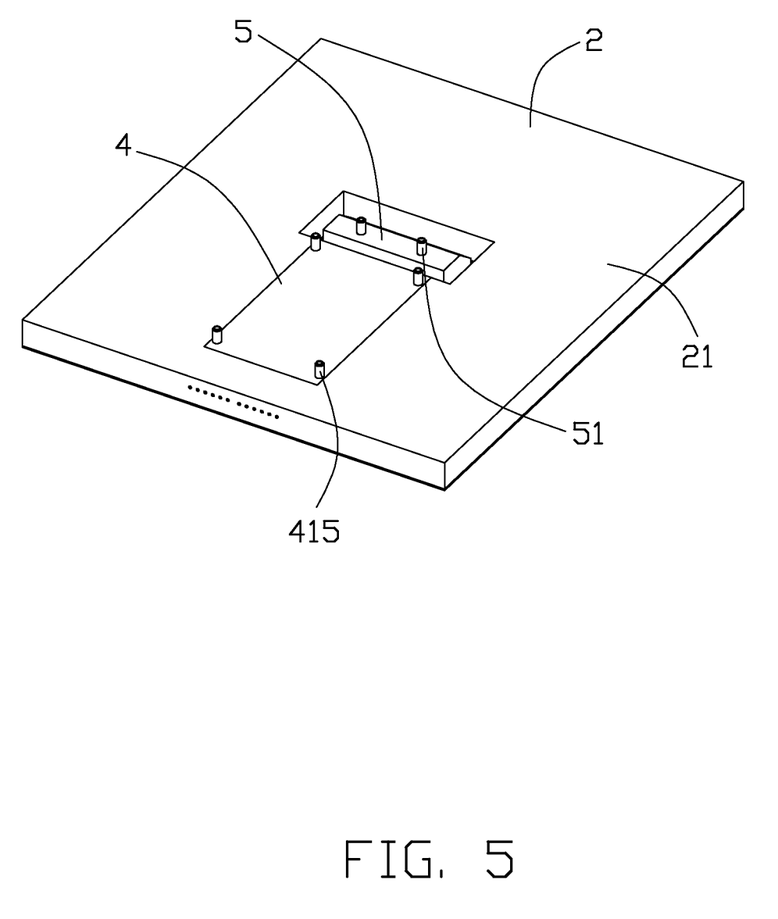
FIG. 5 is a perspective view showing the optical module mounted in the optical layer.

Referring to FIGS. 2-4, the optical layer 2 has a first face 21 and a second face 22 opposite to the first face 21. The optical layer 2 defines a receiving recess 23 recessed from the first face 21 and a slot 24 extending through the first and second faces 21, 22 and communicating with the receiving recess 23.

Figure 6:
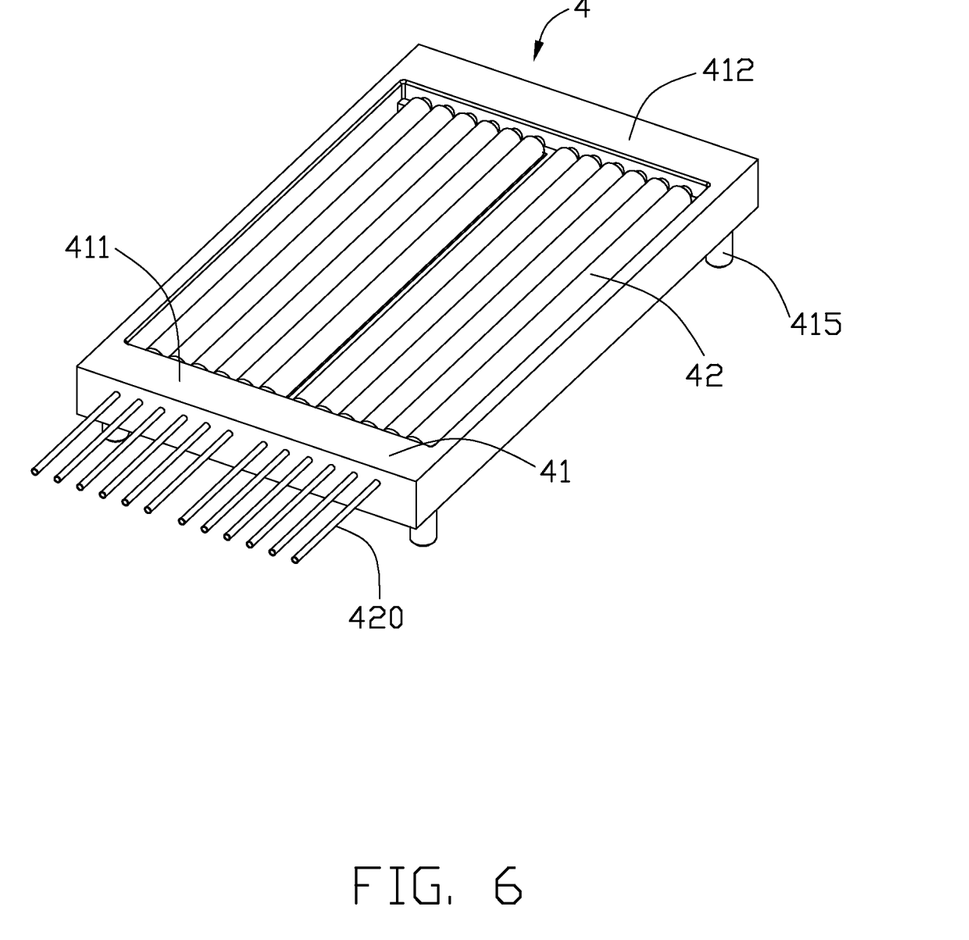
FIG. 6 is an assembled perspective view showing the optical module.
Figure 7:
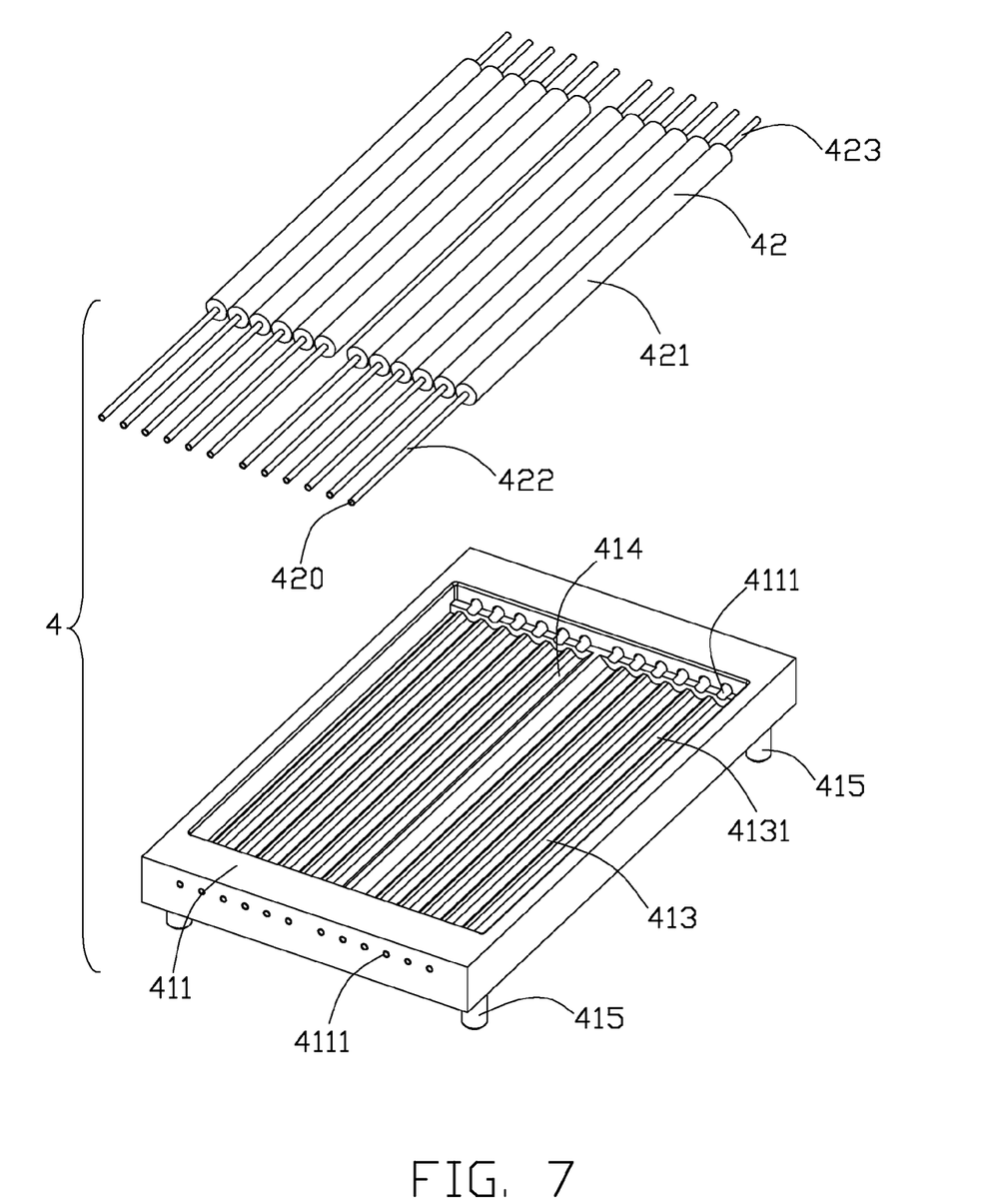
FIG. 7 is an exploded perspective view showing the optical module.

Referring to FIGS. 6 and 7, the optical module 4 comprises a plurality of optical or light transmitting circuits, and a pedestal or ferrule 41 functioning as a light circuit holding member and formed by precision injection molding. The light transmitting circuits in this embodiment are fibers 42. The ferrule 41 comprises a first periphery wall 411, a second periphery wall 412, a base wall 413 connecting between the first periphery wall 411 and the second periphery wall 412, and a positioning cavity 414 defined by these walls. The base wall 413 defines a plurality of grooves 4131 facing toward the positioning cavity 414. Each groove 413 has a semi-circular cross-sectional configuration. The first periphery wall 411 and the second periphery wall 412 respectively defines one row of through holes 4111 communicating with the positioning cavity 414. The first periphery wall 411 and the second periphery wall 412 respectively have a pair of aligning posts 415 extending downwardly therefrom.

Each fiber 42 has a core 420 and a buffer 421 shrouding around the core 420. The core 420 has a first end 422 and a second end 423 opposite to the first end 422.

Referring to FIG. 3, the coupler 5 is of a known design and construction in this art and generally has a 45 degree mirror 52 and a plurality of lens (not shown) opposite to the mirror 52 for aligning with the cores 420.

The cladding layer 3 is made from a material stiffener than that of optical layer 2 for strengthening purpose, and defines a window 31 aligning with the slot 24.

Referring to FIGS. 1-7, in assembling of the optical module 4, firstly, peeling off end portions of the buffer 421 to expose the first end 422 and the second end 423 outside of the buffer 421, with a middle portion of the fiber 42 between the first and second ends 422, 423 still shrouded around by the buffer 421. When the fibers 42 are mounted in the ferrule 41, the buffers 421 of the fibers 42 are positioned in the grooves 4131. The first ends 422 of the fibers 42 insert into the through holes 4111 and penetrate outside of the first periphery wall 411 through the through holes 4111, and the second ends 423 penetrate outside of the second periphery wall 412 through the through holes 4111.

In assembling of the optical board 100, the optical module 4 is mounted on the base layer 1, with the aligning posts 415 inserting into the first mounting holes 11 of the base layer 1. The coupler 5 is received in the slot 24 and coupled with the optical module 4, with the mounting posts 51 inserting in the second mounting holes 12 of the base layer 1. The optically layer 2 is attached to the base layer 1. In conjunction with FIG. 5, the optical module 4 is received in the receiving recess 23, with the first ends 422 of the fibers 42 running through the optical layer 2 in an imagined plane parallel with the first face 21 till a position exposed to the outside. The cladding layer 3 is attached to the optical layer 2, with the window 31 aligning with the coupler 5.

The ferrule 41 defines a plurality of grooves 4131 for positioning the fibers 42. The ferrule 41 together with the fibers 42 are assembled to the optical layer 2. The ferrule 41 and the optical layer 2 are two separated pieces before mounting. Additionally, the receiving recess 23 is recessed from the first face 21 of the optical layer 2 to receive the optical module 4 for protection purpose. The coupler 5 is received in the slot 24 between the first face 21 and the second face 22, which reduces the height of the coupler 5 beyond the optical layer 2.

Figure 8:
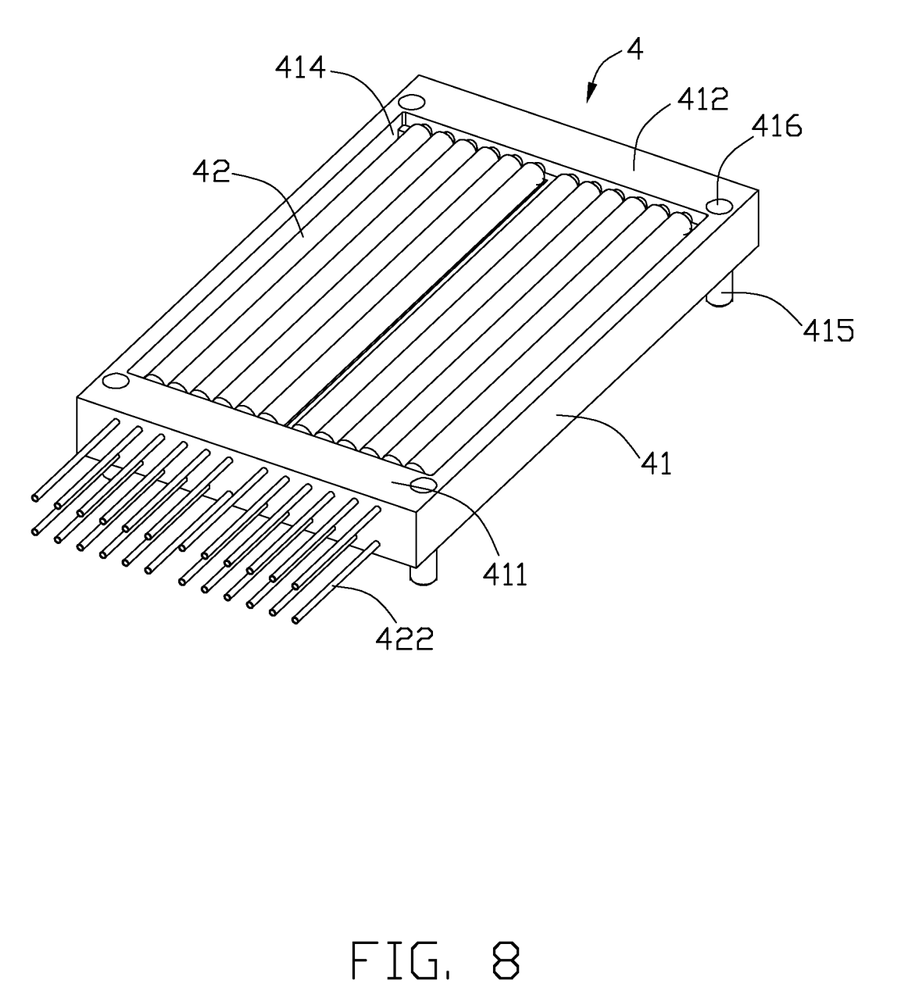
FIG. 8 is an assembled perspective view showing the optical module referred in a second embodiment.
Figure 9:
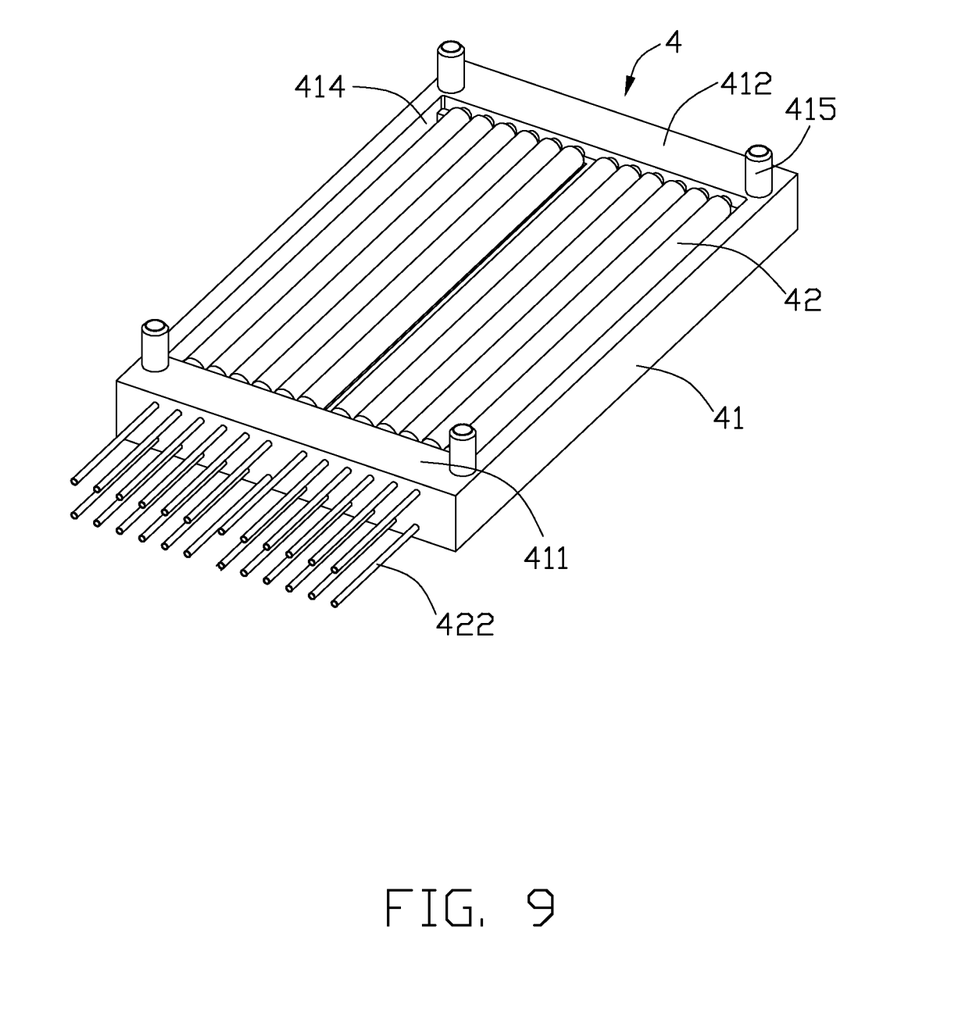
FIG. 9 is another assembled perspective view similar to FIG. 8, taken from another aspect.
Figure 10:
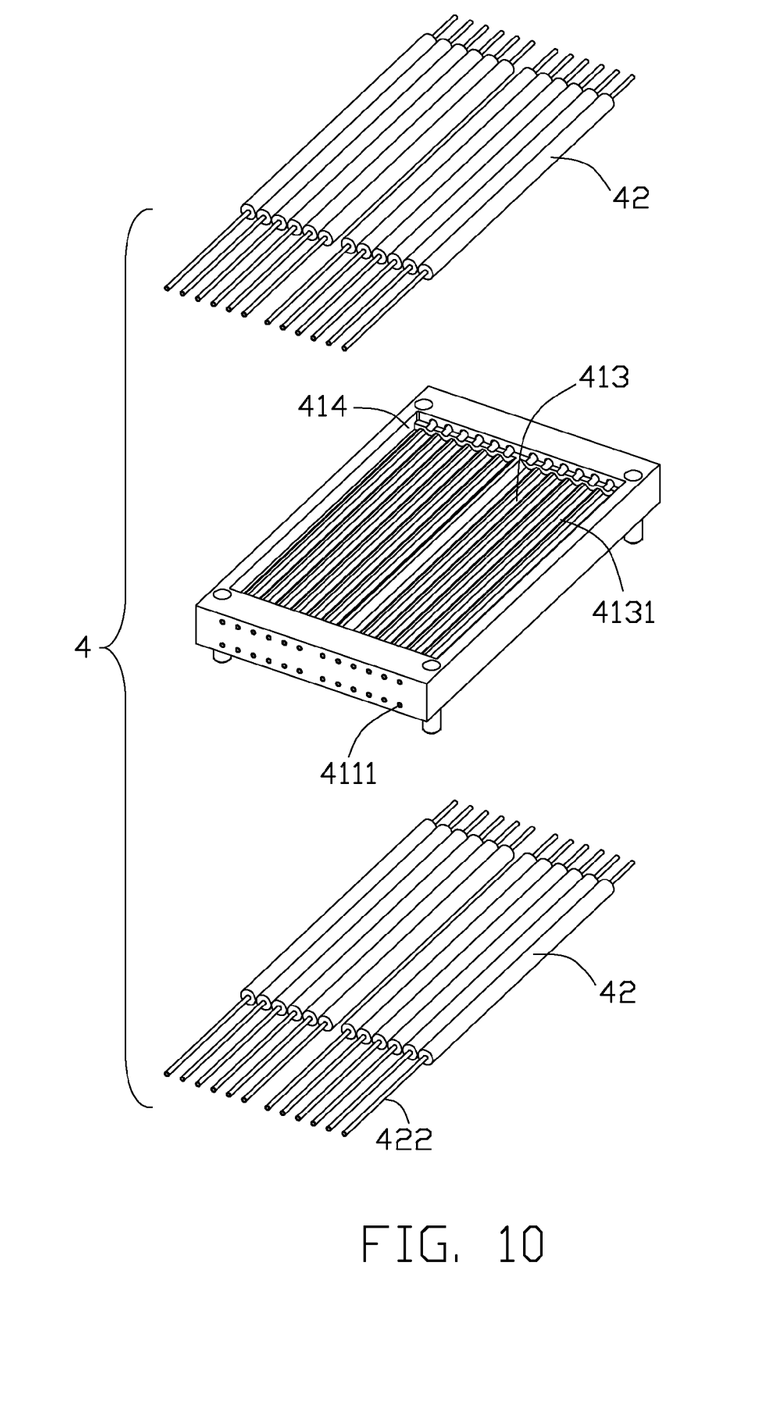
FIG. 10 is an exploded perspective view of the optical module shown in FIG. 8.

The optical board 100 referred in a second embodiment comprises a base layer 1, an optical layer 2, a cladding layer 3 and a coupler 5 identical to that described in the first embodiment and shown in FIG. 3. The optical board 100 further comprises an optical module 4 shown in FIGS. 8-10. The optical module 4 referred in the second embodiment has a configuration similar to that referred in the first embodiment, except that there are one positioning cavity 414 above the base wall 413 and another positioning cavity 414 below the base wall 413. The first and second periphery walls 411, 412 respectively defines two rows of through holes 4111 for extension of the fibers 42.

Figure 11:
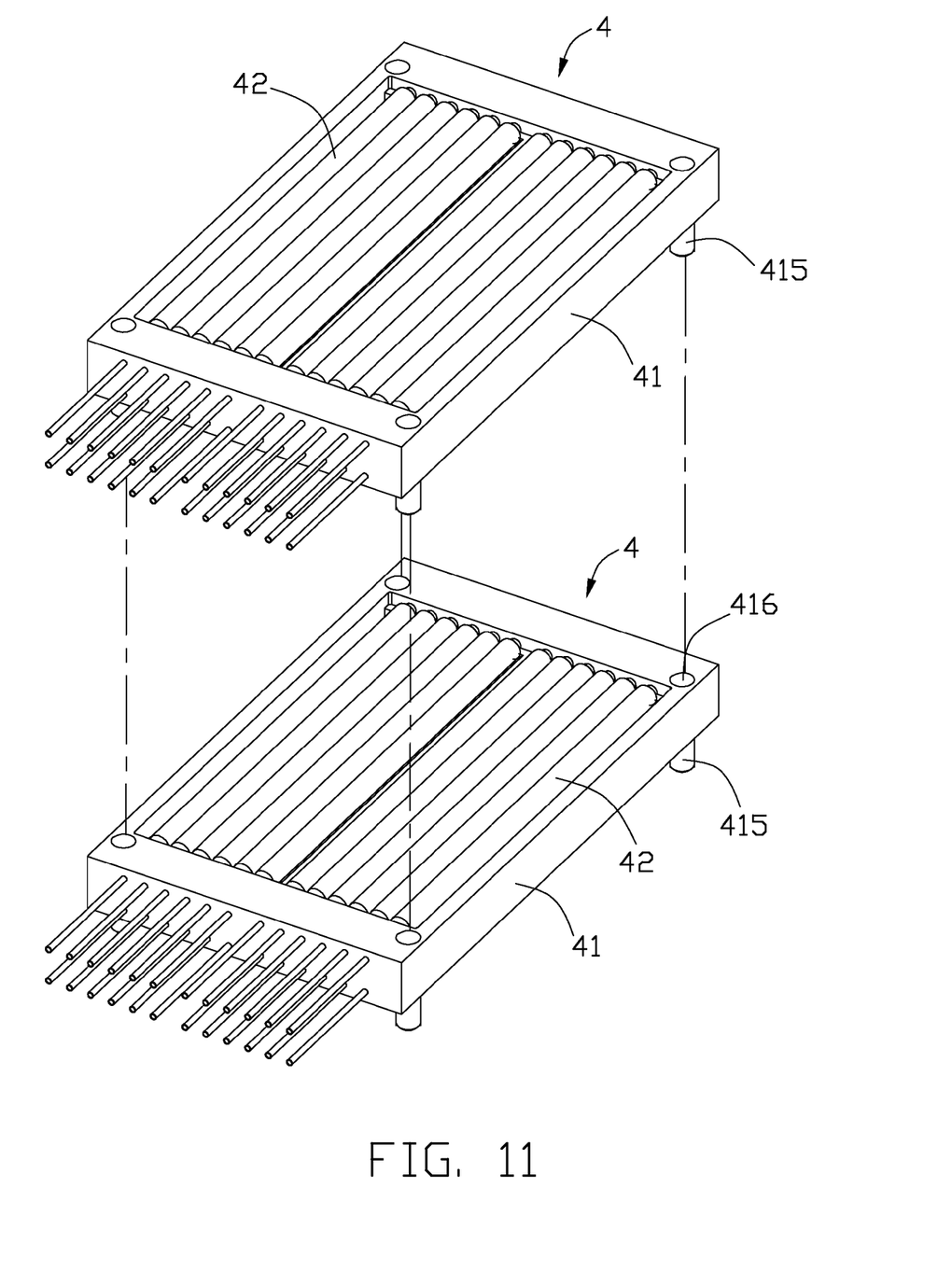
FIG. 11 is a perspective view of two stacked optical modules referred in a third embodiment.

Referring to FIG. 11, the optical board 100 referred in the third embodiment comprises two, even more, optical modules 4 stacked one above another, with the aligning posts 43 of one optical module 4 inserting into the aligning hole 416 of another optical module 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical board comprising:
    a base layer;
    an optical module assembled to the base layer, the optical module comprising a ferrule formed by precision injection molding and defining a plurality of grooves and a plurality of fibers positioned in the grooves of the ferrule, said ferrule comprising a pair of periphery walls, a base wall connecting between the pair of periphery walls, and at lease one positioning cavity between the pair of periphery walls, said plurality of grooves defined in said at lease one positioning cavity, each periphery wall defining a plurality of through holes for extension of the fibers;
    an optical layer attached to the base layer and defining a receiving recess, said ferrule received in the receiving recess, said fibers extending outside of the ferrule and into said optical layer, said optical layer comprising a first face facing the base layer, a second face opposite to the first face, and a slot extending through the optical layer, said receiving recess being recessed from the first face; and
    a coupler attached to the base layer, coupled with said optical module, and accommodated in the slot.

2. The optical board as claimed in claim 1, wherein said base layer defines a plurality of mounting holes, and said coupler comprises a plurality of mounting posts inserting into the mounting holes.

3. The optical board as claimed in claim 1, wherein said receiving recess is disposed below the second face of the optical layer for retaining the optical module, said slot extending through the first and second faces of the optical layer.

4. The optical board as claimed in claim 1, wherein there is one positioning cavity disposed above the base wall, and wherein said plurality of through holes of each periphery wall are arranged into one row communicating with said positioning cavity.

5. The optical board as claimed in claim 1, wherein there are two positioning cavities respectively disposed above the base wall and disposed below the base wall, and wherein said plurality of through holes of each periphery wall are arranged into two rows each communicating with a corresponding positioning cavity.

6. The optical board as claimed in claim 1, wherein each fiber comprises a core and a buffer shrouding around the core, said buffer being partially peeled off to expose two opposite ends of each core, said two opposite ends of each core penetrating into the through holes, each fiber having a middle portion between said two opposite ends still shrouded by the buffer and positioned in the positioning cavity.

7. The optical board as claimed in claim 6, wherein one of the two opposite ends of each fiber is inserted through the optical layer, and the other one of the two opposite ends of each fiber is aligned with the coupler.

8. The optical board as claimed in claim 6, wherein said base layer defines a plurality of holes, and said ferrule of the optical module comprises a plurality of aligning posts inserted into the holes.

9. The optical board as claimed in claim 8, wherein said ferrule of the optical module comprises a plurality of aligning holes, and wherein said optical board comprises two stacked optical modules, with the aligning posts of one of said two optical modules inserting into the aligning holes of the other optical module.

10. The optical board as claimed in claim 1, wherein each groove has a semi-circular shape in cross-section.

11. An optical board as claimed in claim 1,
said fibers extend along a longitudinal direction with two opposite ends communicating with an exterior in said longitudinal direction, respectively;
said coupler is located proximate one end of the ferrule in confrontation with one ends of said fibers; and
said optical layer covers said ferrule and the associated fibers, said optical layer having a through opening into which said coupler is received and exposed to the exterior in a vertical direction perpendicular to said longitudinal direction.

12. The optical board as claimed in claim 11, wherein the base layer cooperates with the optical layer to sandwich the optical module therebetween in said vertical direction.

13. The optical board as claimed in claim 12, wherein a cladding layer is applied upon the optical layer and cooperates with the base layer to sandwich said optical layer therebetween in said vertical direction.

14. The optical board as claimed in claim 13, wherein said cladding layer defines another through opening essentially in alignment with the through opening for light transmission under condition that the coupler does not extend into said another through opening.

15. An optical board comprising:
a base layer;
an optical module assembled to the base layer, the optical module comprising a ferrule defining a plurality of grooves and a plurality of optical fibers positioned in the grooves of the ferrule and extending along a longitudinal direction with two opposite ends communicating with an exterior in said longitudinal direction, respectively;
an optical layer attached to the base layer, covering said ferrule and associated optical fibers, and defining a receiving recess for receiving said ferrule, said optical fibers extending outside of the ferrule and into said optical layer; and
an optical coupler located proximate one end of the ferrule in confrontation with the ends of said optical fibers;
said optical layer having a through opening into which said optical coupler is received and exposed to the exterior in a vertical direction perpendicular to said longitudinal direction.

16. The optical board as claimed in claim 15, wherein the base layer cooperates with the optical layer to sandwich the optical module therebetween in said vertical direction.

17. The optical board as claimed in claim 16, wherein a cladding layer is applied upon the optical layer and cooperates with the base layer to sandwich said optical layer therebetween in said vertical direction.

18. The optical board as claimed in claim 17, wherein said cladding layer defines another through opening essentially in alignment with the through opening for light transmission under condition that the optical coupler does not extend into said another through opening.

\* \* \* \* \*